W. H. GAMBLE.
FORCE FEED LUBRICATOR.
APPLICATION FILED JUNE 25, 1908.

917,578.

Patented Apr. 6, 1909.
3 SHEETS—SHEET 1.

Witnesses
F. L. Ourand
C. H. Griesbauer

Inventor
Walter H. Gamble
By H. B. Willson &Co
Attorneys

W. H. GAMBLE.
FORCE FEED LUBRICATOR.
APPLICATION FILED JUNE 25, 1908.

917,578.

Patented Apr. 6, 1909.
3 SHEETS—SHEET 2.

Witnesses
F. L. Ourand
C. H. Griesbauer

Inventor
Walter H. Gamble
By H. B. Willson & Co.
Attorneys

W. H. GAMBLE.
FORCE FEED LUBRICATOR.
APPLICATION FILED JUNE 25, 1908.

917,578.

Patented Apr. 6, 1909.
3 SHEETS—SHEET 3.

Witnesses
F. L. Ourand
C. H. Griesbauer

Inventor
Walter H. Gamble
by H. B. Willson & Co
Attorneys

UNITED STATES PATENT OFFICE.

WALTER H. GAMBLE, OF LOS ANGELES, CALIFORNIA.

FORCE-FEED LUBRICATOR.

No. 917,578.   Specification of Letters Patent.   Patented April 6, 1909.

Application filed June 25, 1908. Serial No. 440,272.

*To all whom it may concern:*

Be it known that I, WALTER H. GAMBLE, a citizen of the United States, residing at Los Angeles, in the county of Los Angeles and State of California, have invented certain new and useful Improvements in Force-Feed Lubricators; and I do declare the following to be a full, clear, and exact description of the invention, such as will enable others skilled in the art to which it appertains to make and use the same.

This invention relates to improvements in force feed lubricators.

The object of the invention is to provide a lubricator of this character having a plurality of oil discharging ports from which oil is successively forced.

A further object is to provide a lubricator having means to regulate the quantity of oil discharged therefrom.

With these and other objects in view, the invention consists of certain novel features of construction, combination and arrangement of parts as will be described and particularly pointed out in the appended claims.

Figure 1:
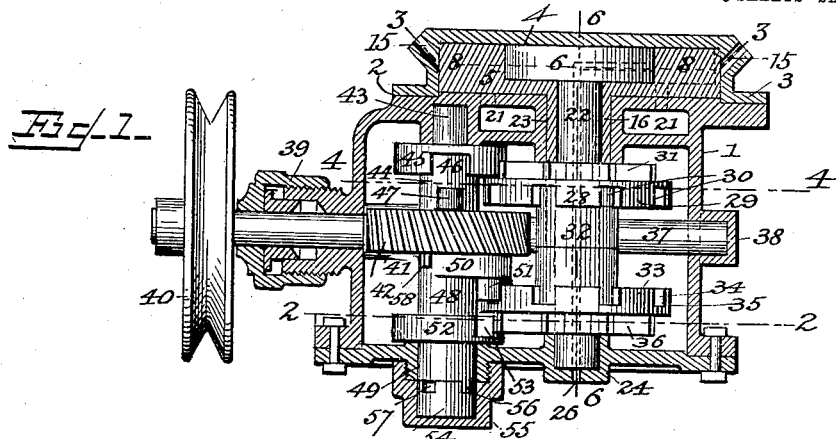
Figure 2:
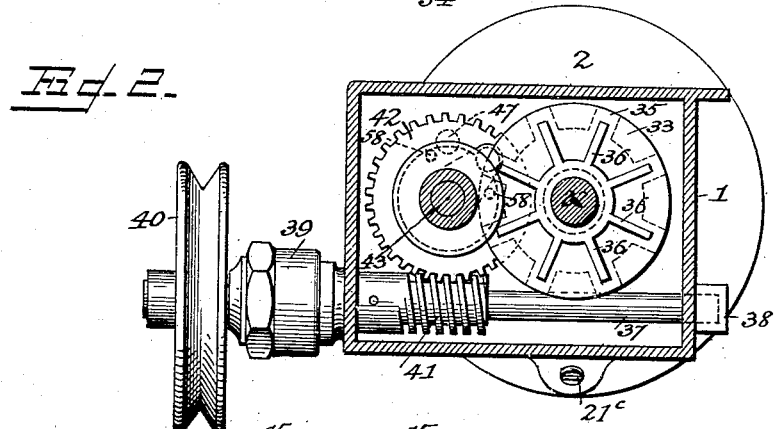
Figure 3:
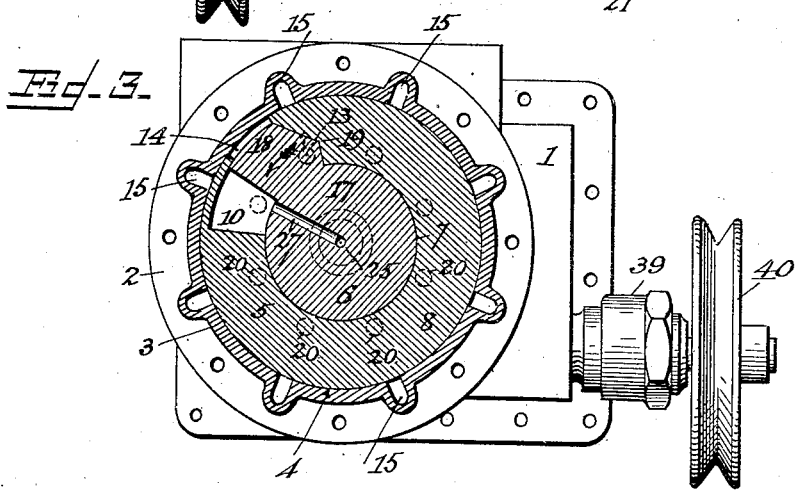
Figure 4:
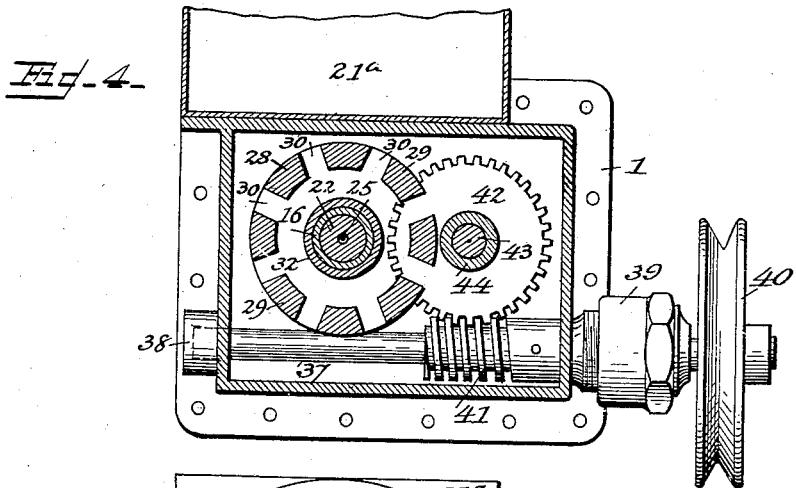
Figure 5:
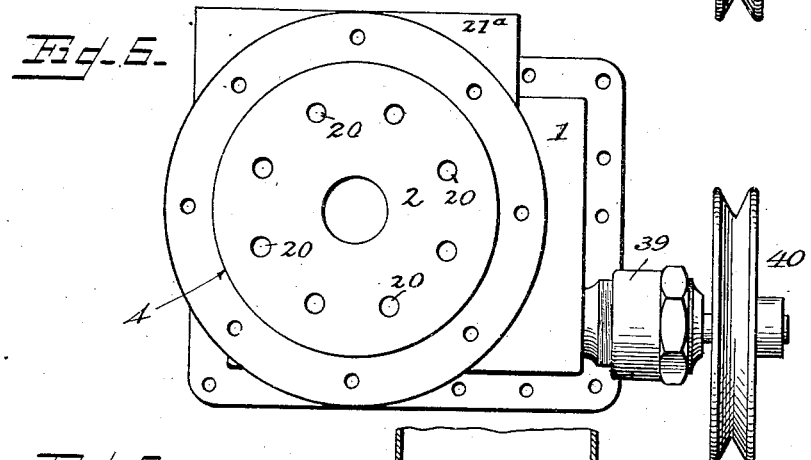
Figure 6:
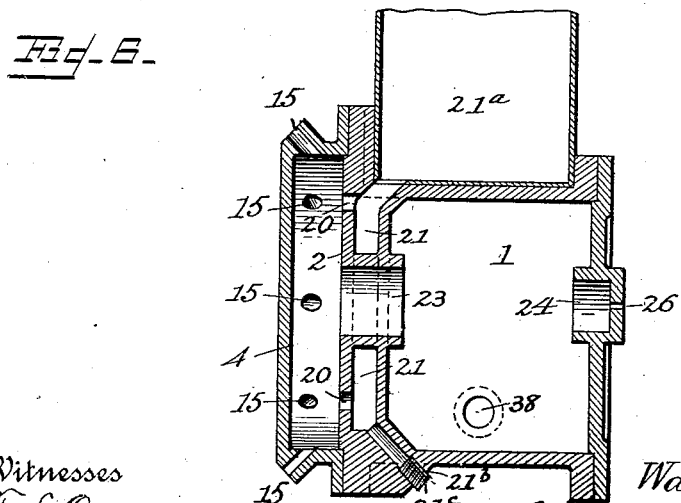
Figure 7:
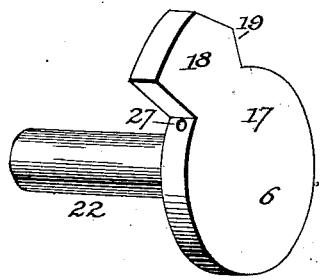
Figure 8:
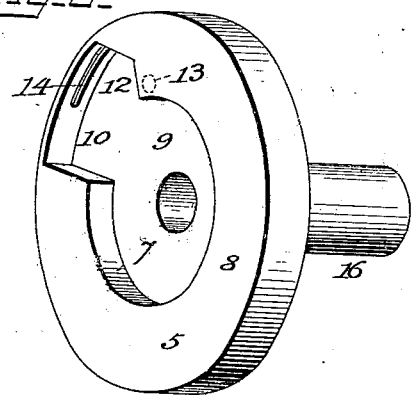
Figure 9:
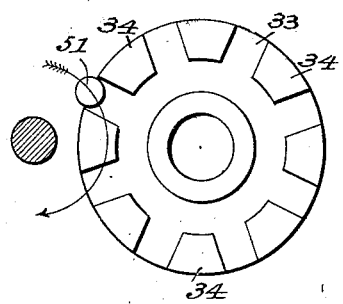
Figure 10:
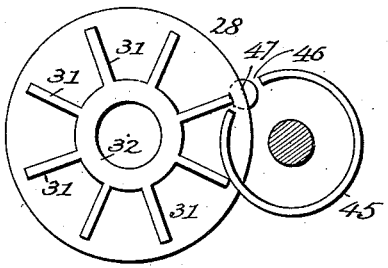
Figure 11:
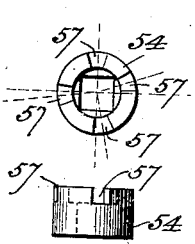
Figure 12:
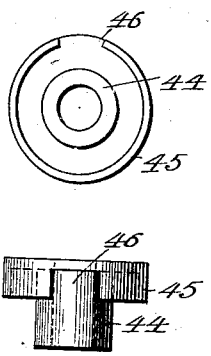
Figure 13:
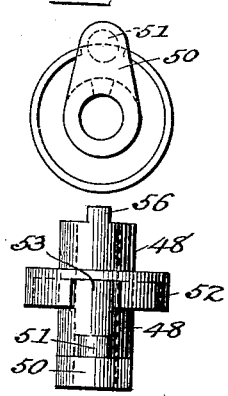

In the accompanying drawings, Figure 1 is a horizontal sectional view of a lubricator constructed in accordance with the invention; Fig. 2 is a vertical sectional view on the line 2—2 of Fig. 1; Fig. 3 is a similar view on the line 3—3 of Fig. 1; Fig. 4 is a similar view on the line 4—4 of Fig. 1; Fig. 5 is a side view of the lubricator casing with the pump casing and chamber removed, and showing the arrangement of the oil suction ports; Fig. 6 is a vertical transverse sectional view of the lubricator and pump casings taken on the line 6—6 of Fig. 1, with the working parts removed; Fig. 7 is a detail perspective view of the inner section of the pump; Fig. 8 is a similar view of the outer section; Fig. 9 is a detail view of one side of the pump operating star wheels, showing the manner in which the same is operated; Fig. 10 is a similar view of the opposite side showing the manner in which the wheel is locked against movement in either direction; Fig. 11 is a detail view of the clutch for regulating the position of one of the star wheel operating devices; and Figs. 12 and 13 are detail views of the clutch controlling star wheel operating device for the star wheel of the inner pump section.

In the embodiment of the invention I provide a lubricator casing, 1, which is here shown and is preferably rectangular in shape and has on one side a circular flange or seat, 2, to which is adapted to be bolted or otherwise secured a pump casing, 3, in which is formed a circular pump chamber, 4. In the pump chamber, 4, is arranged a rotary pump consisting of an outer section, 5, and an inner section, 6.

The outer pump section, 5, consists of a circular disk, 7, on one side of which, adjacent to its edge, is formed an annular flange, 8, which incloses a circular space, 9, in which the inner section, 6, of the pump is adapted to operate. In the flange 8 is formed a radially projecting recess, 10, which extends to near the outer edge or circumference of the flange, as shown. One of the radial walls of the recess, 10, is notched as shown at 12, and in said notched portion and through the disk 7 is formed a suction port 13. In the outer wall of the recess 10 is formed an elongated discharge passage or port, 14, which is adapted to be brought into communication with a series of discharge ports, 15, formed in the edge of the pump casing, 3, as shown. With the discharge ports 15 are adapted to be connected leads for conveying the oil to various parts of the machine to be lubricated. The disk 7 of the outer pump section is provided with a centrally disposed tubular shaft, 16, the passage of which extends through the disk 7, as shown.

The inner section of the pump consists of a circular disk or plate 17, the diameter of which is substantially the same as the circular space, 9, formed by the flange 8 of the outer pump section, 5. The disk, 17, of the inner pump section is adapted to work in the space, 9, and on said disk is formed a radially projecting wing, 18, which is adapted to work in the recess 10 of the flange, 8. One edge of the wing 18 is offset or formed at an angle as shown at 19 to engage and fit into the notched wall, 12, of the recess, 10, and when so engaged, the wing, 18, will cover the suction port, 13, in the plate, 7, and the slot, 14, in the outer wall of the recess, 10. The suction port, 13, in the plate, 7, of the outer pump section is adapted to be brought into alinement with a series of suction ports, 20, formed in the adjacent wall of the lubricator casing and communicating with an annular oil pocket, 21, which is supplied with oil from a suitable reservoir 21ª, arranged on the lubricator casing. The lower portion of the oil pocket, 21, is provided with a drain port, 21ᵇ, which is normally closed by a screw plug, 21ᶜ.

The disk or plate, 17, of the inner pump section 6 is provided on one side with a centrally disposed, laterally projecting shaft, 22, which, when the plate, 17, is in an operative position in the space, 9, will project through the tubular shaft, 16, of the outer pump section.

The shafts 16 and 22 of the outer and inner pump sections project through a bearing passage, 23, formed in the adjacent side of the lubricator casing. The shaft, 22, of the inner pump section extends through the lubricator casing and has its opposite end mounted in a suitable bearing, 24, formed in the opposite side of the casing, as shown. The shaft, 16, of the outer pump section extends into the casing to near the center of the same. The shaft, 22, of the inner pump section is provided with a longitudinally disposed passage, 25, the outer end of which communicates with a vent, 26, formed in the end of the bearing, 24, of the lubricator casing. The opposite end of the passage, 25, communicates with a radially disposed passage, 27, formed in the plate or disk, 17, of the inner pump section, and communicating at its outer end with the space, 10, formed in the flange, 8, of the outer pump section, whereby the air in said space between the wing, 18, and the lower wall of said space, is permitted to pass out as said wing is moved toward the lower wall of said space, thus preventing the air from compressing and forming an obstruction to the movement of the wing, 18, and the inner pump section.

On the tubular shaft, 16, of the outer pump section, and adjacent to the pump side of the lubricator casing, is fixedly mounted a star wheel, 28, said wheel consisting of a disk having on one side a series of laterally projecting lugs, 29, between each of which is formed a radially disposed passage, 30, the purpose of which will hereinafter appear. On the opposite sides of the star wheel disk is formed a series of radially disposed locking ribs, 31, said ribs being arranged exactly opposite to or in line with the passages, 30, on the opposite side of the disk. There may be any suitable number of passages and ribs formed on the star wheel, 28, the same being here shown as provided with eight ribs, and corresponding passages. The wheel, 28, is provided with a centrally disposed hub, 32, which projects inwardly on the tubular shaft of the outer pump section.

On the shaft, 22, of the inner pump section is fixedly mounted a star wheel, 33, which consists of a disk having on one side a series of laterally projecting lugs, 34, between which are formed radially disposed passages, 35. On the opposite side of the disk is formed a series of radially disposed locking ribs, 36, arranged directly opposite or in line with the passages on the opposite side of the disk. The star wheels, 28 and 33, are of the same construction, the star wheel 28 being provided to intermittently operate the outer pump section, while the star wheel, 33, is provided to intermittently operate the inner pump section.

The star wheels and pump section are operated from any suitable moving part of the machine to which the lubricator is applied, or by any other suitable power, and the means for transferring the motion of said movable part to the star wheels will now be described.

In the lower portion of the lubricator casing and preferably in the center thereof is mounted a worm shaft, 37. The shaft, 37, extends through the casing and has its inner end journaled in a suitable bearing, 38, formed in one side of the casing, while its opposite end is mounted in a packed bearing, 39, on the opposite side of the casing. On the outer end of the shaft, 37, is arranged a band wheel, 40, with which is adapted to be engaged a suitable operating belt or band which extends to a moving part of the machine or other source of power. On the shaft, 37, is formed a worm 41, which is engaged with a worm wheel, 42, fixedly mounted on a shaft, 43, which extends through the lubricator casing parallel to the pump shafts, 16 and 22. On the end of the shaft, adjacent to the star wheel, 28, is fixedly mounted a sleeve, 44, on one end of which is arranged a radially projecting disk having on its inner side a laterally projecting, annular locking rim or flange, 45, in which is formed a gap or space, 46, into which the ribs 31 of the star wheel, 28, are adapted to enter to permit the star wheel to turn. On the adjacent side of the worm wheel, 42, is mounted a star wheel operating roller, 47, which, when the worm wheel is revolved, is adapted to engage the passages 30 between the lugs 29 on the star wheel, 28, and thereby revolve said star wheel and the outer section of the pump to which said star wheel is attached one-eighth of a revolution. The roller, 47, is arranged directly in line with the gap, 46, in the locking rim so that when the roller, 47, engages one of the passages, 30, in the star wheel, the corresponding rib, 31, on the opposite side of the star wheel will simultaneously engage the gap, 46, in the locking rim, thereby permitting said star wheel to turn. As soon as the roller 47 has turned the star wheel one-eighth of a revolution and passed out of the passage, 30, the cylindrical surface of the rim 45 will be brought to a locking position between two of the ribs, 31, thereby holding the star wheel against further movement until the roller, 47, has again reached a position to engage the next passage, 30, of the wheel.

On the end of the worm gear shaft, 43, adjacent to the star wheel, 33, is loosely mounted a sleeve, 48, the outer end of which projects into a bearing opening, 49, formed in the adjacent wall of the lubricator casing, as shown. On the sleeve, 48, preferably at its inner end is formed a radially projecting crank arm, 50, on the outer end of which is mounted a laterally projecting roller, 51, which is adapted to be engaged with the passages, 35, in the star wheel, 33, and to turn said star wheel, and the inner section of the pump to which it is connected, one-eighth of a revolution. On the sleeve, 48, adjacent to the side of the casing is arranged a disk having an inwardly projecting, annular flange or rib, 52, which is provided with a gap or passage, 53, with which the ribs, 36, of the star wheel 33 are engaged to permit said wheel to be turned by the roller, 51, on the crank arm 50.

The sleeve, 48, is loosely mounted on the shaft of the worm gear to provide for the adjustment of the roller, 51, whereby the movement of the star wheel, 33, is regulated to vary the time and distance of the movement of the inner pump section, whereby a greater or less amount of oil will be drawn through the suction ports, 13 and 20, in the outer pump section and the adjacent wall of the lubricator casing before said port 20 is cut off by the movement of the outer pump section. In order to lock the sleeve, 48, on the worm gear shaft and to hold the arm 50 and roller, 51, in their adjusted position, I provide a clutch collar, 54, which is adapted to be slipped onto the outer end of the worm gear shaft, 43, which projects beyond the end of the sleeve, 48, and through the bearing, 49, in the side of the lubricator casing. A removable cap, 55, is provided to cover the clutch collar, 54, and the ends of the shaft, 43, and sleeve, 48, said cap preferably having a screw-threaded engagement with the side of the casing, as shown. On the end of the sleeve, 48, is formed a longitudinally projecting locking lug or tooth, 56, which is adapted to engage with one of a series of locking notches, 57, formed in the inner end of the clutch collar, 54. The collar is provided with a square bore or passage which receives the squared end of the shaft 43, when the collar is placed thereon so that by turning the collar to different positions before placing the same on the squared end of the shaft, the positions of the notches will be varied so that the locking lugs or teeth, 56, on the sleeve, 48, may be caused to engage whichever notch in the clutch gives the desired adjustment to the crank arm, 50, and roller, 51, to cause the star wheel to operate the inner section of the pump at the proper time with respect to the movement of the outer section thereof by the star wheel, 28, in the opposite side of the lubricator casing.

When it is desired to change the position of the sleeve 48 to adjust the arm, 50, and roller, 51, it is simply necessary to unscrew the cap, 55, from the side of the casing and with the fingers remove the clutch collar, 54, from the squared end of the shaft and turn the same to the proper position for bringing the desired notch, 57, therein, into engagement with the lug or tooth, 56, on the end of the sleeve, 48. In the side of the worm gear, 42, adjacent to the crank arm, 50, are arranged stop pins, 58, which are placed a suitable distance apart and are designed to limit the adjustment of the arm, 50, and thus prevent the same and the roller, 51, from being moved out of operative position with respect to the passages, 35, of the star wheel, 33.

In the operation of the device, assuming the parts of the pump to be in the position shown in Fig. 3 of the drawings, wherein the suction and discharge ports, 13 and 14, of the outer pump section are covered by the wing, 18, of the inner pump section, said pump section and wing begin to rotate in the direction shown by the arrow, thereby uncovering the suction ports 13 and also opening the discharge port, 14, and causing the oil from the oil pocket, 21, to flow through the ports, 20, of the lubricator casing, with one of which the port 13 always registers, and the suction port, 13. As soon as the port, 13, opens, the oil flows by suction and gravity into the constantly enlarging space between the angular wall, 19, of the wing, 18, and the adjacent wall, 12, of the space, 10, while the air in the space on the opposite side of the wing is forced out through the passages 27 and 25 in the inner pump section and its shaft and is discharged through the vent, 26, in the side of the casing, thus preventing the air from compressing in this space. The wing, 18, continues to rotate until stopped by the lower wall of the space, 10, at which time the outer pump section begins to move in the pump casing through its operating mechanism. Both pump sections now move together and the port 13 is thereby moved out of alinement with the port, 20, in the lubricator casing with which it previously registered. After the port 13 has thus been moved out of alinement with the port, 20, the discharge port, 14, will be brought into alinement with one of the discharge ports, 15, formed in the edge of the pump casing, thereby causing the oil in the passage, 10, to pass out of said port and into the lead connecting therewith by which it is conducted to the parts of the machine to be lubricated.

The operating parts of the device are so arranged that when the discharge port, 14, in the outer pump section reaches the next adjacent discharge port, 15, in the pump casing, the inner pump section will be locked against further movement, while the outer pump section will continue to move around until the notched wall, 12, of the passage, 10, is again brought into engagement with the angular edge, 19, of the wing, 18, thereby closing the space on this side of the wing and forcing all of the oil therethrough out through the discharge port, 15, as hereinbefore described. This cycle of operations is repeated for each set of ports, and the oil is thereby delivered to each bearing or part of the machine to which the leads from the discharge ports, 15, are connected.

From the foregoing description, taken in connection with the accompanying drawings, the construction and operation of the invention will be readily understood without requiring a more extended explanation.

Various changes in the form, proportion and the minor details of construction, may be resorted to without departing from the principle or sacrificing any of the advantages of the invention as defined in the appended claims.

Having thus described my invention, what I claim as new and desire to secure by Letters-Patent, is:

1. In a force feed lubricator, a lubricator casing, a pump casing connected to said lubricator casing, a pumping mechanism, comprising an outer section revolubly mounted in said pump casing, and an inner section arranged to operate in said outer section whereby oil is drawn into and forced out of said pump casing, star wheels connected to said pump sections, a driving mechanism, and means whereby said star wheels are operatively connected to said driving mechanism to independently operate said pump sections, substantially as described.

2. In a force feed lubricator, a lubricator casing, a pump casing connected to said lubricator casing, a pumping mechanism, comprising an outer section revolubly mounted in said pump casing, and an inner section arranged to operate in said outer section whereby oil is drawn into and forced out of said pump casing, star wheels connected to said pump sections, a driving mechanism, operating devices connected to said driving mechanism, and adapted to be engaged with said star wheels whereby the latter are independently operated, and means to lock said star wheels against movement, substantially as described.

3. In a force feed lubricator, a lubricator casing, a pump casing connected to said lubricator casing, a pumping mechanism comprising an outer section revolubly mounted in said pump casing, and an inner section arranged to operate in said outer section whereby oil is drawn into and forced out of said pump casing, star wheels connected to said pump sections, locking ribs on said star wheels, a driving mechanism, operating rollers actuated by said driving mechanism to engage and intermittently operate said star wheels, and locking devices actuated by said driving mechanism to engage the locking ribs on said star wheels whereby the latter are held against movement, substantially as described.

4. In a force feed lubricator, a lubricator casing, a pump casing connected to said lubricator casing, a pumping mechanism comprising an outer section revolubly mounted in said pump casing, and an inner section arranged to operate in said outer section whereby oil is drawn into and forced out of said pump casing, star wheels connected to said pump sections, locking ribs on said star wheels, a drive shaft having a worm, a worm gear operated by said worm, operating rollers actuated by said worm gear to engage and intermittently operate said star wheels, and locking devices actuated by said worm gear to engage the locking ribs on said star wheels whereby the latter are held against movement, substantially as described.

5. In a force feed lubricator, a lubricator casing, a pump casing, a pumping mechanism arranged in said pump casing, a drive shaft having a worm, a worm gear shaft, a worm gear mounted thereon, sleeves on said gear shaft, locking rims on said sleeves, said rims having gaps formed therein, operating rollers actuated by said worm gear, star wheels operatively connected to said pump, said star wheels having a series of radial passages adapted to be engaged by said operating rollers, and a series of radial locking ribs adapted to be engaged with the gaps in said locking rims, substantially as described.

6. In a force feed lubricator, a lubricator casing, a pump casing, a pumping mechanism comprising inner and outer coöperating sections, independent shafts connected to said pump sections, a main drive shaft, a driving gear shaft, a driving gear fixedly mounted on said shaft and operated by said main drive shaft, an operating sleeve fixedly mounted on one end of said gear shaft, an operating sleeve loosely mounted on the opposite end of said shaft, locking rims on said sleeves, said rims having gaps formed therein, a crank arm on said loose sleeve, an operating roller on said arm, an operating roller on said driving gear, a star wheel on each of said pump shafts, said wheels having radial passages to receive said operating rollers, radial locking ribs on said star wheels to engage said locking rims and thereby hold said wheels against movement and to enter the gaps in said rims to permit said wheels to turn, and an adjustable clutch mechanism to lock said loose sleeve to said gear shaft, whereby the position of the operating roller on said sleeve is changed to regulate the movement of one of said pump sections and thereby regulate the quantity of oil discharged by said pump, substantially as described.

7. In a force feed lubricator, a lubricator casing, a pump casing connected to said lubricator casing, a pumping mechanism, comprising an outer section revolubly mounted in said pump casing, and an inner section arranged to operate in said outer section whereby the oil is drawn into and forced out of said pump, star wheels connected to said pump sections, locking ribs on said star wheels, a drive shaft having a worm, a worm gear operated by said worm, operating devices, one of which is loosely mounted and the other fixedly mounted on the shaft of said worm gear, a clutch device to connect said loose operating device with said shaft, and locking devices to engage the locking ribs on said star wheels whereby the latter are held against movement, substantially as described.

8. In a force feed lubricator, a lubricator casing having an oil pocket, a series of suction ports, an oil reservoir connected to said pocket, a pump casing having a series of discharge ports, a pumping mechanism consisting of an outer hollow section having suction and discharge ports and a tubular shaft, and an inner section adapted to work in said hollow outer section and having a wing adapted to open and close the suction and discharge ports in said outer section, a shaft on said inner section adapted to project through the tubular shaft in said outer section, independent operating devices on said shaft and a driving mechanism to intermittently actuate said operating devices whereby the pump sections are independently operated, substantially as described.

9. In a force feed lubricator, a lubricator casing having a series of suction ports, a pump casing having a series of discharge ports, a pump consisting of an outer section comprising a disk having a suction port to register with the suction ports in said lubricator casing, an annular laterally projecting flange on said disk, said flange having a radially disposed recess, in the outer wall of which is formed a discharge port adapted to co-act with the discharge ports in said pump casing, and an inner pump section adapted to operate in the space formed by the flange on said outer section, a wing on said inner pump section adapted to operate in the recess formed in the flange on said outer section whereby oil is drawn through said suction ports and forced out through said discharge ports, and means to operate said pump sections, substantially as described.

In testimony whereof I have hereunto set my hand in presence of two subscribing witnesses.

WALTER H. GAMBLE.

Witnesses:
JAMES R. VEACH,
JOHN RUPP.